US00RE37290E

(19) United States
(12) Reissued Patent
David

(10) Patent Number: US RE37,290 E
(45) Date of Reissued Patent: Jul. 24, 2001

(54) APPARATUS FOR PREVENTING CONFINEMENT IN A VEHICLE TRUNK

(76) Inventor: Ellis Morton David, 2108 W. McRae Way, Phoenix, AZ (US) 85027

(21) Appl. No.: 09/344,384

(22) Filed: Jun. 24, 1999

Related U.S. Patent Documents

Reissue of:
(64) Patent No.: 5,859,479
Issued: Jan. 12, 1999
Appl. No.: 08/957,006
Filed: Oct. 23, 1997

(51) Int. Cl.[7] ..... B60L 1/14
(52) U.S. Cl. ..... 307/10.8; 70/92; 292/DIG. 65; 307/10.1; 340/471
(58) Field of Search ..... 307/9.1, 10.1, 307/10.8, 157; 340/425.5, 468, 471, 426, 479; 315/77; 116/28 R; 70/237, 255, 256, 257, 92; 292/92, DIG. 43, DIG. 65; 362/496, 542; 361/172

(56) References Cited

U.S. PATENT DOCUMENTS 3,582,639 * 6/1971 Chamberlain ..... 362/496
3,992,909 * 11/1976 McGhee ..... 70/92
4,080,812 * 3/1978 Knott ..... 70/256
4,155,233 * 5/1979 Lira ..... 70/92
4,342,210 * 8/1982 Denningham ..... 70/278
4,464,649 * 8/1984 Her ..... 340/471
4,881,148 * 11/1989 Lambropoulos et al. ..... 361/172
5,445,326 * 8/1995 Ferro et al. ..... 292/DIG. 43
5,719,551 * 2/1998 Flick ..... 340/426
5,933,090 * 8/1999 Christenson ..... 70/256

* cited by examiner

*Primary Examiner*—Albert W. Paladini
(74) *Attorney, Agent, or Firm*—Parsons & Goltry; Michael W. Goltry; Robert A. Parsons

(57) ABSTRACT

The present invention is a device which installed in a vehicle that enables a vehicle trunk to be opened from the interior of the trunk and enables at least one of the tail lights to blink. The present invention can be retrofit to existing vehicles by connecting a prepared box and wiring harness to the vehicle power supply, trunk release solenoid, and taillights. The present invention has a ON/OFF switch which enables the circuit controlling the blinking of at least one tail light. A second switch activates the trunk release opening solenoid causing the trunk lock retract opening the trunk. The present invention is mounted in such a way as to be operable by an individual confined to the trunk and be concealed from the casual observer.

47 Claims, 2 Drawing Sheets

APPARATUS FOR PREVENTING CONFINEMENT IN A VEHICLE TRUNK

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to vehicle compartment opening devices. More particularly, the present invention relates to a device to open a vehicle compartment, such as a trunk, when a person is forcibly confined to the inside.

2. Description of the Prior Art

Many times a year individuals are forcibly confined in a vehicle trunk. During the confinement there are numerous opportunities for the individual to escape if the trunk could be opened or a signal to the outside world could be sent indicating a problem. While the prior art addresses the opening of a vehicle compartment such as a trunk by a remote means, the opening of a trunk and transmission of an emergency signal while confined within is new and unique.

Numerous innovations for Anti-Confinement Device have been provided in the prior art that are described as follows. Even though these innovations may be suitable for the specific individual purposes to which they address, they differ from the present invention as hereinafter contrasted.

In U.S. Pat. No. 5,631,628, titled Safety Brake Light for High Profile Vehicle, invented by Rene G. Solis, Jr., a safety brake light for high profile vehicle including a plurality of lights. Two of the lights are secured on opposing sides of a trailer of a high profile vehicle at a level consistent with eye level of passenger vehicles and positioning two of the lights on opposing sides of the high profile vehicle at a level consistent with eye level of trucks and buses.

The patented invention differs from the present invention because the patented invention is a safety brake light. The patented invention lacks the trunk opening feature of the present invention and the in trunk activation.

In U.S. Pat. No. 5,558,424, titled Emergency Vehicle Light Bar Assembly, invented by Stephen J. Zeligson an emergency vehicle light bar assembly employs first and second connected substantially horizontal elongated frames mounted transversely across the upper surface of an emergency vehicle. The connecting assembly is such that the second frame may be substantially continuously vertically displaced while maintaining parallel relationship of the frames so that the emergency indicating equipment fixed atop the second frame maintains its operational attitude regardless of the elevation to which the second frame is raised. Reciprocable operation of the connecting assembly may be accomplished by electric, hydraulic, pneumatic or manual drive systems.

The patented invention differs from the present invention because the patented invention is an emergency vehicle light bar which is attached to the roof of an emergency vehicle. The patented invention lacks the trunk opening feature of the present invention and the in trunk activation capability.

In U.S. Pat. No. 5,276,594, titled Add-on Vehicle Safety Light Monitor. invented by Mark E. Burkett an add-on vehicle light monitor includes a light pipe formed of a light coupling transparent material and having an input end and an output end. The light pipe is configured to be supported upon the vehicle body at a position in which the input end is approximate to the to-be-monitored light source and the output end is viewable by the vehicle driver or operator. In one embodiment, an aperture is formed within the vehicle taillight lens to permit the input end to be inserted into the vehicle light assembly. In an alternate embodiment, the input end is fabricated so as to be flush mountable to the light assembly lens without the need for forming an aperture therein.

The patented invention differs from the present invention because the patented invention is an add-on vehicle light monitor which consists of a light pipe viewable by the vehicle driver. The patented invention lacks the trunk opening feature of the present invention and the in trunk activation capability.

In U.S. Pat. No. 4,903,174, titled Vehicle Emergency Light Kit, invented by Edward Busby an emergency rear light kit for temporary installation on the back of a vehicle or trailer provides lights for a vehicle when the vehicle lights fail. The kit has two rear light units that can be easily mounted on the back of a vehicle or trailer, a control box with manual switches to operate indicator, brake and tail lights. An extension cable with plug and socket is provided to suit all lengths of vehicle and trailer.

The patented invention differs from the present invention because the patented invention is an emergency rear light kit which provides lights for a vctidcle when the vehicle lights fail. The patented invention lacks the trunk opening feature of the present invention and the in trunk activation capability.

In U.S. Pat. No. 4,054,789, titled Vehicle Safety Light, invented by Frances Romanelli a vehicular warning light mounted in a storage position on a bracket in the interior of the trunk of a motor vehicle. The bracket is attached to the trunk cover. Upon lifting the trunk cover and closing a switch mounted on the dashboard of the vehicle, a flashing red light is activated and a latch retracted to enable the light to pivot to a use position in a substantially vertical plane.

The patented invention differs from the present invention because the patented invention is a vehicular warning light which is in the interior of the trunk lid. The patented invention is deployed after lifting the trunk lid and activating a switch on the vehicle dash board. The patented invention lacks the trunk opening feature of the present invention and the in trunk activation capability.

In U.S. Pat. No. 4,020,047, titled Emergency Vehicle Light, invented by Oliver Burland an emergency vehicle light wherein an elongated plastic globe is secured to an elongated base for mounting atop the vehicle, the globe being generally obround in plan having longitudinally extending sidewalls and hemicylindrical end walls, the sidewalls being equipped with stepped internal ribs to support placards so as to transmit different visual images than from lights within the globe.

The patented invention differs from the present invention because the patented invention is an emergency vehicle light which is mounted on the roof of an emergency vehicle. The patented invention lacks the trunk opening feature of the present invention and the in trunk activation capability.

In U.S. Pat. No. D335,359, titled Retractable Emergency Trouble Light for Motor Vehicle, invented by Bryan A. Grubb an ornamental design for a retractable emergency trouble light for a motor vehicle, as shown and described.

In U.S. Pat. No. D334,820, titled Auxilary Vehicle Emergency Light, invented by Kyung C. Lce an ornamental design for an auxiliary vehicle emergency light, as shown and described.

In U.S. Pat. No. D316,684, titled Emergency Light with Integral Suction Cup for Attachment to Vehicle Window, invented by Peter Bonadonna an ornamental design for an emergency fight with integral suction cup for attachment to a vehicle window, as shown and described.

The above three patented inventions differs from the present invention because the patented inventions are ornamental designs for lights which are mounted external to a vehicle. The patented inventions lacks features that are similar to the present invention.

Numerous innovations for Anti-Confinement Device have been provided in the prior art that are adapted to be used. Even though these innovations may be suitable for the specific individual purposes to which they address, they would not be suitable for the purposes of the present invention as heretofore described.

SUMMARY OF THE INVENTION

The present invention is a device which installed in a vehicle that enables a vehicle trunk to be opened from the interior of the trunk and enables at least one of the tail lights to blink. The present invention can be retrofit to existing vehicles by connecting a prepared box and wiring harness to the vehicle power supply, trunk release solenoid, and tail-lights. The present invention has an ON/OFF switch which enables the circuit controlling the blinking of at least one tail light. A second switch activates the trunk release opening solenoid causing the trunk lock retract opening the trunk. The present invention is mounted in such a way as to be operable by an individual confined to the trunk and be concealed so the casual observe cannot see it.

The types of problems encountered in the prior at are opening of the trunk of a vehicle from the inside.

In the prior art. unsuccessful attempts to solve this problem were attempted namely: switches located in the driver compartment which activate a trunk release device none of the prior art specifically addresses opening of a trunk form the inside in an emergency. However, the problem was solved by the present invention because a trunk opening device is provided in a side the trunk which is activated by a person confined therein. Further, the present invention includes a circuitry which causes the tail lights of the vehicle to blink providing a visual indication that there is a problem. The tails lights may be programed to transmit a message via a code such as SOS In Morse Code.

The present invention went contrary to the teaching of the art in which the trunk opening device is located in the driver compartment of the vehicle and a second release is located inside the trunk.

The present invention solved a long felt need for a way of escaping from the trunk of a vehicle when involuntarily confined within a trunk.

Accordingly, it is an object of the present invention to provide a trunk lid release device located in the trunk.

More particularly, it is an object of the present invention to provide a electronic circuit which causes the rear tail lights to blink.

In keeping with these objects, and with others which will become apparent hereinafter, one feature of the present invention resides, briefly stated, in a power connection which is made to a source which is not interrupted by the ignition switch.

In accordance with another feature of the present invention, a momentary switch activates the trunk latching mechanism releasing the trunk lid.

Another feature of the present invention is that at least one tail light is connected to a power source through a circuit which when activated causes the tail light to blink.

Yet another feature of the present invention is that a microchip is programed to cause a light to blink a distress code.

Still another feature of the present invention is that the electronics, and switches are contained in a housing.

The novel features which are considered characteristic for the invention are set forth in the appended claims. The invention itself, however, both as to its construction and its method of operation, together with additional objects and advantages thereof, will be best understood from the following description of the specific embodiments when read and understood in connection with the accompanying drawings.

DESCRIPTION OF THE PREFERRED EMBODIMENT

Figure 1:
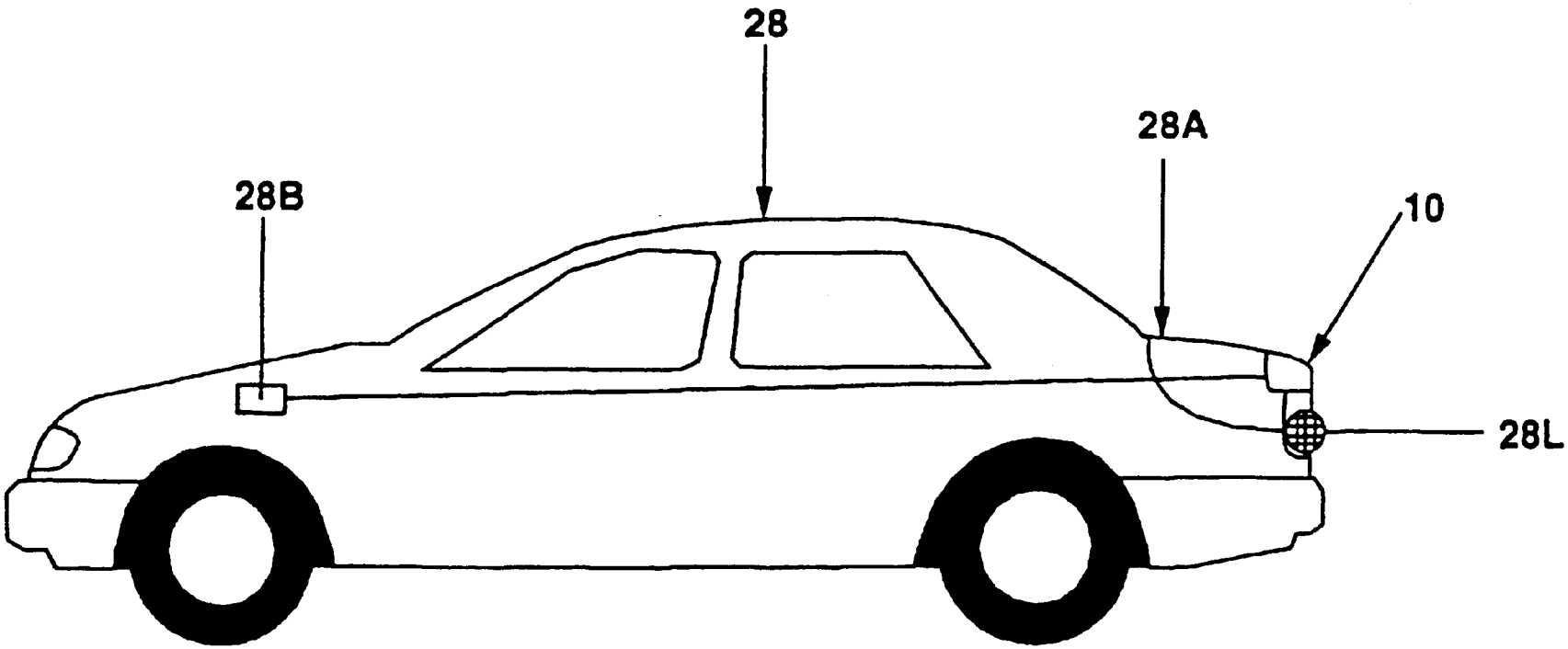
FIG. 1 is a cross sectional view of a vehicle containing an anti-confinement device (10).
Figure 2:
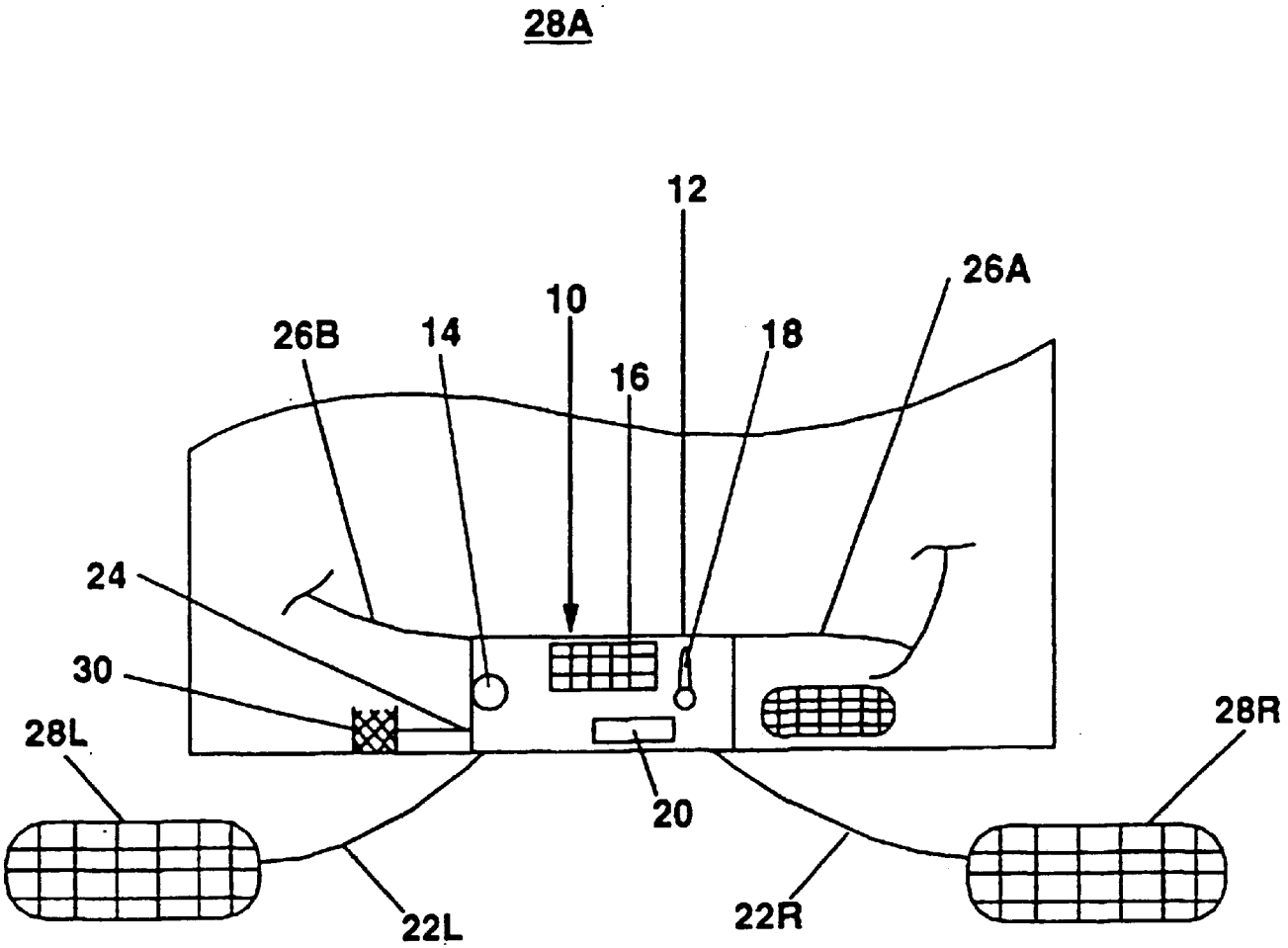
FIG. 2 is a bottom view of a vehicle trunk having an anti-confinement device (10) mounted therein.

Referring to FIG. 1 which is a cross sectional view of a vehicle (28) containing an anti-confinement device (10) and FIG. 2 which is a bottom view of a vehicle trunk (28A) having an anti-confinement device (10) mounted. The anti-confinement device (10) is installable on an inside surface of a vehicle trunk (28A) of a vehicle (28) functioning to prevent a person from being locked therein. The anti-confinement device (10) comprises a housing (12) which is material selected from a group consisting of plastic, plastic composite, metal, metal alloy, epoxy, fiberglass, carbon-graphite, rubber, rubber composite, wood, and wood composite.

The anti-confinement device (10) further comprises a microchip (20) which is contained within the housing. The microchip (20) is electrically connected at one distal end to a left tail light electrical line (22L) which is electrically connected at an opposite distal end to a vehicle left tail light (28L). The microchip (20) is further electrically connected at one distal end to a right tail light electrical line (22R) which is electrically connected at an opposite distal end to a vehicle right tail light (28R). The microchip (20) is further electrically connected at one distal end to a trunk latch elecrical line (24) which is electrically connected at an opposite distal end to an electronic trunk latch (30). The microchip (20) is further electrically connected at one distal end to a positive electrical line (26A) which is electrically connected at an opposite distal end to a vehicle power means (28B). The microchip (20) is further electrically connected at one distal end to a negative electrical line (26B) which is electrically connected at an opposite distal end to a ground.

The anti-confinement device (10) still further comprises a first switch which is electrically connected to the microchip (20). The first switch is a toggle switch (18). When the first switch is activated, a first electrical impulse is transmitted through the trunk latch elecrical line (24) opening the electronic trunk latch (30). A second electrical impulse is 60 transmitted through the left tail light electrical line (22L) and the right tail light electrical line (22R) functioning to flash the vehicle left tail light (28L) and the vehicle right tail light (28R) indicating an emergency condition exists in the vehicle.

The microchip (20) may cause the vehicle left tail light (28L) and vehicle right tail light (28R) to blink a distress code such as SOS in Morse Code.

The anti-confinement device (10) still further comprises a second switch which is electrically connected between the positive electrical line (26A) and a light (16). When the second switch is activated, the light (16) is turned ON. The second switch is a push button switch (14).

It will be understood that each of the elements described above, or two or more together, may also find a useful application in other types of constructions differing from the type described above.

While the invention has been illustrated and described as embodied in a Anti-Confinement Device, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. An anti-confinement device (10) installable on an inside surface of a vehicle trunk (28A) of a vehicle (28) preventing a person from being locked therein, the anti-coafinement device (10) comprising:

A) a housing (12);

B) a microchip (20) contained within the housing, the microchip (20) is electrically connected at one distal end to a left tail light electrical line (22L) which is electrically connected at an opposite distal end to a vehicle left tail light (28L), the microchip (20) is further electrically connected at one distal end to a right tail light electrical line (22R) which is electrically connected at an opposite distal end to a vehicle right tail light (28R), the microchip (20) is further electrically connected at one distal end to a trunk latch elecrical line (24) which is electrically connected at an opposite distal end to an electronic trunk latch (30), the microchip (20) is further electrically connected at one distal end to a positive electrical line (26A) which is electrically connected at an opposite distal end to a vehicle power means (28B), the microchip (20) is further electrically connected at one distal end to a negative electrical line (26B) which is electrically connected at an opposite distal end to a ground;

C) a first switch is electrically connected to the microchip (20), when the first switch is activated, a first electrical impulse is transmitted through the trunk latch elecrical line (24) opening the electronic trunk latch (30), a second electrical impulse is transmitted through the left tail light electrical line (22L) and the right tail light electrical line (22R) functioning to flash the vehicle left tail light (28L) and the vehicle right tail light (28R) indicating an emergency condition exists in the vehicle; and a second switch is electrically connected between the positive electrical line (26A) and a light (16), when the second switch is activated, the light (16) is turned ON.

2. The anti-confinement device (10) as described in claim 1, wherein the second switch is a push button switch (14).

3. The anti-confinement device (10) as described in claim 1, wherein the first switch is a toggle switch (18).

4. The anti-confinement device (10) as described in claim 1, wherein the microchip (20) causes the vehicle left tail light (28L) and vehicle right tail light (28R) to blink a distress code.

5. The anti-confinement device (10) as described in claim 4, wherein the distress code is SOS in Morse Code.

*6. In a vehicle having external lights and a trunk movable between open and closed conditions, a device comprising a switch accessible for actuation by an occupant enclosed in the trunk for actuating one or more of the external lights, the one or more of the external lights observable from outside the trunk in the closed condition.*

*7. The device of claim 6, wherein the switch is coupled electrically to one or more of the lights.*

*8. The device of claim 6, wherein the switch comprises a toggle switch.*

*9. The device of claim 6, further including a microchip for causing one of more of the lights to blink a distress code in response to actuation of the switch.*

*10. The device of claim 9, wherein the microchip is coupled electrically to the switch.*

*11. The device of claim 9, wherein the microchip is coupled electrically to one or more of the lights.*

*12. In vehicle having lights and an electronic latch for engaging a lid to enclose a trunk, a device comprising a switch mounted to the vehicle and accessible for actuation by an occupant enclosed in the trunk for actuating at least one of (a) the electronic latch to release the lid and (b) one or more of the lights.*

*13. The device of claim 12, wherein the switch is coupled electrically to the electronic latch.*

*14. The device of claim 12, wherein the switch is coupled electrically to one or more of the lights.*

*15. The device of claim 12, wherein the switch comprises a toggle switch.*

*16. An assembly comprising:*

*a vehicle trunk and an electronic latch movable between a first condition to define a closed condition of the vehicle trunk and a second condition to define an open condition of the vehicle trunk; and*

*a switch mounted to the trunk, the electronic latch movable between the first and second conditions in response to actuation of the switch from within the vehicle trunk.*

*17. The assembly of claim 16, wherein the switch is coupled electrically to the electronic latch.*

*18. The assembly of claim 16, wherein the switch comprises a toggle switch.*

*19. An assembly comprising:*

*a vehicle having external lights and a trunk movable between an open condition and a closed condition, one or more of the external lights movable between a first condition and a second condition for emitting a stimulus; and*

*a switch mounted to the vehicle, the one or more of the external lights movable between the first and second conditions in response to the actuation of the switch from within the trunk, the stimulus observable from outside the trunk in the closed condition.*

*20. The assembly of claim 19, wherein the switch is coupled electrically to the one or more of the external lights.*

*21. The assembly of claim 19, wherein the switch comprises a toggle switch.*

*22. The assembly of claim 19, wherein the stimulus comprises a flashing stimulus.*

*23. The assembly of claim 22, further including a microchip for causing the one of more of the external lights to emit the flashing stimulus in response to actuation of the switch.*

*24. The assembly of claim 23, wherein the microchip is coupled electrically to the switch.*

*25. The assembly of claim 24, wherein the microchip is coupled electrically to the one or more of the external lights.*

*26. In a vehicle having a trunk and an electronic latch movable between a first condition to define a closed condition of the trunk and a second conditon to define an open condition of the trunk, apparatus comprising a switch mounted to the trunk, the electronic latch movable between the first and second conditions in response to acutation of the switch from within the trunk.*

*27. Apparatus of claim 26, wherein the switch is coupled electrically to the electronic latch.*

*28. Apparatus of claim 26, wherein the switch comprises a toggle switch.*

*29. In a vehicle having external lights and a trunk movable between an open condition and a closed condition, apparatus comprising a switch mounted to the vehicle, one or more of the external lights movable into an energized condition in response to actuation of the switch from within the trunk, the one or more of the external lights observable from outside the trunk in the closed condition.*

*30. Apparatus of claim 29, wherein the switch is coupled electrically to one or more of the external lights.*

*31. Apparatus of claim 29, wherein the switch comprises a toggle switch.*

*32. Apparatus of claim 29, wherein the energized condition comprises a blinking condition of the one of more of the external lights.*

*33. In a vehicle including external lights and trunk having a lid and an electronic latch movable between a first condition for engaging the lid to define a closed condition of the trunk and a second condition for releasing the lid to define an open condition of the trunk, apparatus comprising a switch mounted to the vehicle, one or more of (a) the electronic latch movable between the first and second conditions in response to actuation of the switch from within the trunk, and (b) one or more of the external lights movable into an energized condition in response to acutation of the switch from within the trunk.*

*34. Apparatus of claim 33, wherein the switch is coupled electrically to the electronic latch.*

*35. Apparatus of claim 33, wherein the switch is coupled electrically to one or more of the external lights.*

*36. Apparatus of claim 33, wherein the switch comprises a toggle switch.*

*37. In a vehicle including a trunk that can be opened and closed with an electronic latch, a device comprising:*

*an electronic latch release unit movable between a first position that permits the electronic latch to close the trunk and a second position that permits the electronic latch to open the trunk; and*

*to permit the trunk to be opened from within the trunk, an actuating unit mounted to the vehicle for causing the electronic latch release unit to assume the second position.*

*38. The device of claim 37, wherein the actuating unit is coupled electrically to the release unit.*

*39. The device of claim 37, wherein the actuating unit comprises a switch.*

*40. The device of claim 37, wherein the actuating unit is electrically connected to at least one light of the vehicle for actuating the light.*

*41. A device for unlocking a latch of a trunk of a vehicle to enable an individual locked in the trunk to escape confinement comprising:*

*an electronic actuator for unlocking the latch; and*

*means mounted to the vehicle for actuating the electronic actuator from within the vehicle trunk.*

*42. The device of claim 41, wherein the means is coupled electrically to the electronic actuator.*

*43. The device of claim 41, wherein the means comprises a switch.*

*44. The device of claim 41, wherein the means comprises a switch engagable by the individual to open the trunk lid.*

*45. A method for providing the excape of an individual locked in a trunk of a vehicle comprising the steps of:*

*providing the vehicle with an electronic latch;*

*mounting an actuating unit to the trunk; and*

*actuating the actuating unit from within the trunk to actuate the electronic latch.*

*46. The method of claim 45, further comprising the step of electrically linking the electronic latch to the actuating unit.*

*47. The method of claim 45, wherein the step of actuating the actuating unit from within the trunk further includes the step of actuating an electrical switch.*

* * * * *

UNITED STATES PATENT AND TRADEMARK OFFICE

CERTIFICATE OF CORRECTION

PATENT NO. : RE 37, 290 E
DATED : July 24, 2001
INVENTOR(S) : David, Ellis Morton It is certified that error appears in the above-identified patent and that said Letters Patent is hereby corrected as shown below:

Column 5,
Line 33, replace “coafinement” with -- confinement --.

Column 8,
Line 34, replace “excape” with -- escape --.

Signed and Sealed this

Twenty-ninth Day of October, 2002

*Attest:*

*Attesting Officer*

JAMES E. ROGAN
*Director of the United States Patent and Trademark Office*